United States Patent
Bezard et al.

(10) Patent No.: US 11,679,567 B2
(45) Date of Patent: Jun. 20, 2023

(54) TOOL FOR MANUFACTURING A SELF-STIFFENED PANEL, AND METHOD FOR MANUFACTURING A SELF-STIFFENED PANEL USING SAID TOOL

(71) Applicant: Airbus Operations SAS, Toulouse (FR)

(72) Inventors: Gilles Bezard, Saint Herblain (FR); Nicolas Fordos, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/708,103

(22) Filed: Mar. 30, 2022

(65) Prior Publication Data
US 2022/0314557 A1    Oct. 6, 2022

(30) Foreign Application Priority Data

Apr. 1, 2021 (FR) ...................................... 2103404

(51) Int. Cl.
*B29C 70/32* (2006.01)
*B29C 70/34* (2006.01)
*B29C 70/54* (2006.01)

(52) U.S. Cl.
CPC ............. *B29C 70/34* (2013.01); *B29C 70/32* (2013.01); *B29C 70/541* (2013.01)

(58) Field of Classification Search
CPC .................................................. B29C 70/34
See application file for complete search history.

(56) References Cited

U.S. PATENT DOCUMENTS

| 5,015,168 A * | 5/1991 | Boime ............... B29D 99/0017 |
| | | 425/389 |
| 7,270,722 B2 * | 9/2007 | Navas ..................... B29C 70/46 |
| | | 156/212 |
| 7,464,508 B2 * | 12/2008 | Fournie ................. B29C 70/345 |
| | | 52/309.1 |
| 2010/0155984 A1 | 6/2010 | Hollensteiner et al. |
| 2011/0206875 A1 | 8/2011 | Kohlen |
| 2015/0274326 A1 | 10/2015 | Sana et al. |

FOREIGN PATENT DOCUMENTS

| EP | 2361753 A1 | 8/2011 |
| EP | 2517858 A1 | 10/2012 |
| WO | 2007148301 A2 | 12/2007 |

OTHER PUBLICATIONS

French Search Report; priority document.

* cited by examiner

*Primary Examiner* — Jeffry H Aftergut
(74) *Attorney, Agent, or Firm* — Greer, Burns & Crain, Ltd.

(57) ABSTRACT

A tool for creating a self-stiffened panel, which comprises a support, a set of punches and a channel delimited between two punches, for each punch, a first securing arrangement including a slider that is able to move in translation on the support and at least one hook secured to the slider, and a second securing arrangement including at least one nose integral with the punch, and an actuating arrangement that moves the slider from a securing position in which each nose is located between the support and a hook, to a release position in which the hooks are offset with respect to the noses. With such a tool, each punch is held in position over its length, which ensures correct positioning during lay-up, even in the event of the tool being rotated.

9 Claims, 4 Drawing Sheets

TOOL FOR MANUFACTURING A SELF-STIFFENED PANEL, AND METHOD FOR MANUFACTURING A SELF-STIFFENED PANEL USING SAID TOOL

CROSS-REFERENCES TO RELATED APPLICATIONS

This application claims the benefit of the French patent application No. 2103404 filed on Apr. 1, 2021, the entire disclosures of which are incorporated herein by way of reference.

FIELD OF THE INVENTION

The present invention relates to a tool for manufacturing a self-stiffened panel, and to a method for manufacturing a self-stiffened panel using such a tool.

BACKGROUND OF THE INVENTION

A self-stiffened panel comprises a skin, which may be flat or curved, and stiffeners which are integral with the skin and extend perpendicular to the skin. The stiffeners serve to stiffen the skin in order to improve its mechanical strength.

Each stiffener takes the form of an elongate profile whose cross section can be of various shapes, for example U-shaped, L-shaped or T-shaped.

There exist various methods for creating this type of self-stiffened panel using composite material. For example, it is known to use inserts having the negative shape of the stiffeners. First layers of fibers are deposited onto the inserts, which are then secured next to one another on a frame. Second layers of fibers are then deposited onto the first layers, to form the skin and render the first layers of two adjacent inserts integral with one another.

The assembly is then placed in a vacuum bag and heated in an autoclave in order to polymerize the resin contained in the layers of fibers and, after curing, the inserts are removed leaving the stiffened layers of fibers.

Although a method of this kind yields good results when the self-stiffened panel is flat overall, it cannot be implemented when a cylindrical self-stiffened panel is to be obtained. Indeed, in order to create a cylindrical self-stiffened panel of this kind, it is necessary to turn the assembly over in order to deposit the second layers of fibers all around, and it may then happen that the inserts deform when subjected to centrifugal force and gravity, which can lead to defects in the cylindrical self-stiffened panel.

SUMMARY OF THE INVENTION

One aim of the present invention is to propose a tool for the manufacture of a self-stiffened panel by means of which it is possible to control the geometry of the self-stiffened panel, even in the event of the tool being rotated.

That end, a tool for creating a self-stiffened panel is proposed, the tool comprising:
 a support having a shaft with an axis,
 a set of punches arranged next to one another parallel to the axis, a channel parallel to the axis being delimited between two adjacent punches,
 for each punch, two securing systems, where each securing system comprises first securing means comprising a slider that is able to move in translation on the support parallel to the axis and at least one hook secured to the slider, and second securing means comprising at least one nose integral with the punch,
 for each punch, two main securing means, each being provided at one end of the punch and adopting either a locking position in which the punch is locked on the support or an unlocking position in which the punch is not locked on the support, and
 actuating means that are intended to move the slider alternately from a securing position in which each nose is located between the support and a hook, to a release position in which the hooks are offset with respect to the noses parallel to the axis.

With such a tool, each punch is held in position over its length, which ensures correct positioning during lay-up, even in the event of the tool being rotated.

Advantageously, for each punch, the tool comprises two removable shims, each being positioned between an end of the punch and the support.

Advantageously, for two adjacent punches, the first securing means corresponding to one of the punches and the first securing means corresponding to the other of the punches share a slider.

Advantageously, at each end of the slider, the slider has pierced in it an oblong window and the tool comprises a holding screw screwed into a tapped hole of the support through the oblong window, the head of the holding screw extending beyond the edges of the oblong window.

Advantageously, each hook is integral with a body that is removably secured to the slider.

Advantageously, the tool comprises two set screws secured to the support, the first set screw passes through the slider and the body via first oblong windows provided for that purpose, the second set screw passes through the slider via a second oblong window provided for that purpose, the body has a notch, and the notch is arranged so as to receive the second set screw in the securing position.

Advantageously, the support comprises, at its lower part, a wall that extends around the perimeter of the support.

The invention also proposes a method for manufacturing a self-stiffened panel made of composite material using a tool according to the invention, the manufacturing method comprising:
 a first provision step during which the support is provided, and during which the shaft is secured to a chuck of a rotating machine,
 a second provision step during which punches are provided,
 a first lay-up step during which first layers of fibers are deposited onto the punches,
 a deposition step during which a punch laid-up in this manner is deposited onto the support,
 a locking step during which the main means of securing the punch wedged in this manner are placed in the locking position,
 a securing step during which the systems for securing the punch locked in this manner are moved from the release position to the securing position,
 a first step of looping back to the deposition step until all of the punches have been deposited,
 a second lay-up step during which second layers of fibers are deposited onto the first layers of fibers,
 a vacuum-bagging step during which the assembly which has been laid-up in this manner is placed in a vacuum bag,
 a heating step during which the assembly which has been vacuum-bagged in this manner is heated in an autoclave, a release step during which the systems for securing a punch are moved from the securing position to the release position, an unlocking step during which the main means of securing the punch released in this manner are placed in the unlocking position, a removal step during which the punch unlocked in this manner is removed by displacement parallel to the axis, and a second step of looping back to the release step until all of the punches have been removed.

Advantageously, the manufacturing method comprises, between the deposition step and the locking step, a wedging step during which the shims are positioned between the punch deposited in this manner and the support.

BRIEF DESCRIPTION OF THE DRAWINGS

The above-mentioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

Figure 1:
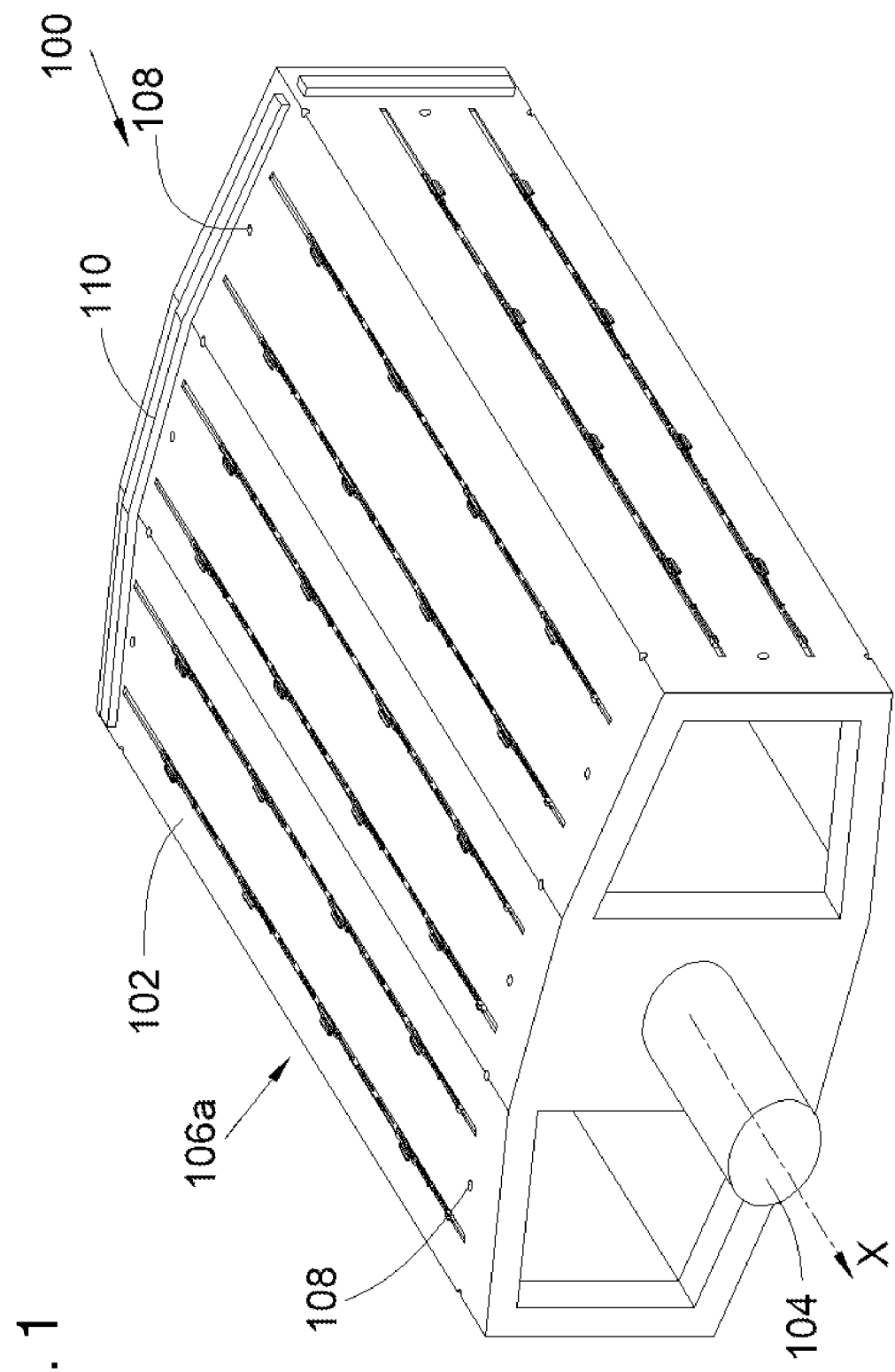
FIG. 1 is a perspective view of a support of a tool according to the invention.

FIG. 1 shows a support 100 which comprises a shaft 104 having an axis X and envelope 102 which is integral with the shaft 104 and is in the form of a cylinder whose generatrices are parallel to the axis X.

The shaft 104 is intended to cooperate with a chuck of a rotating machine in order to rotate the support 100 about the axis X.

In the embodiment of the invention shown in FIG. 1, the envelope 102 is overall in the form of eight-faced prism, but the shape of the envelope 102 may be different depending on the geometry of the self-stiffened panel that is to be obtained.

Figure 2:
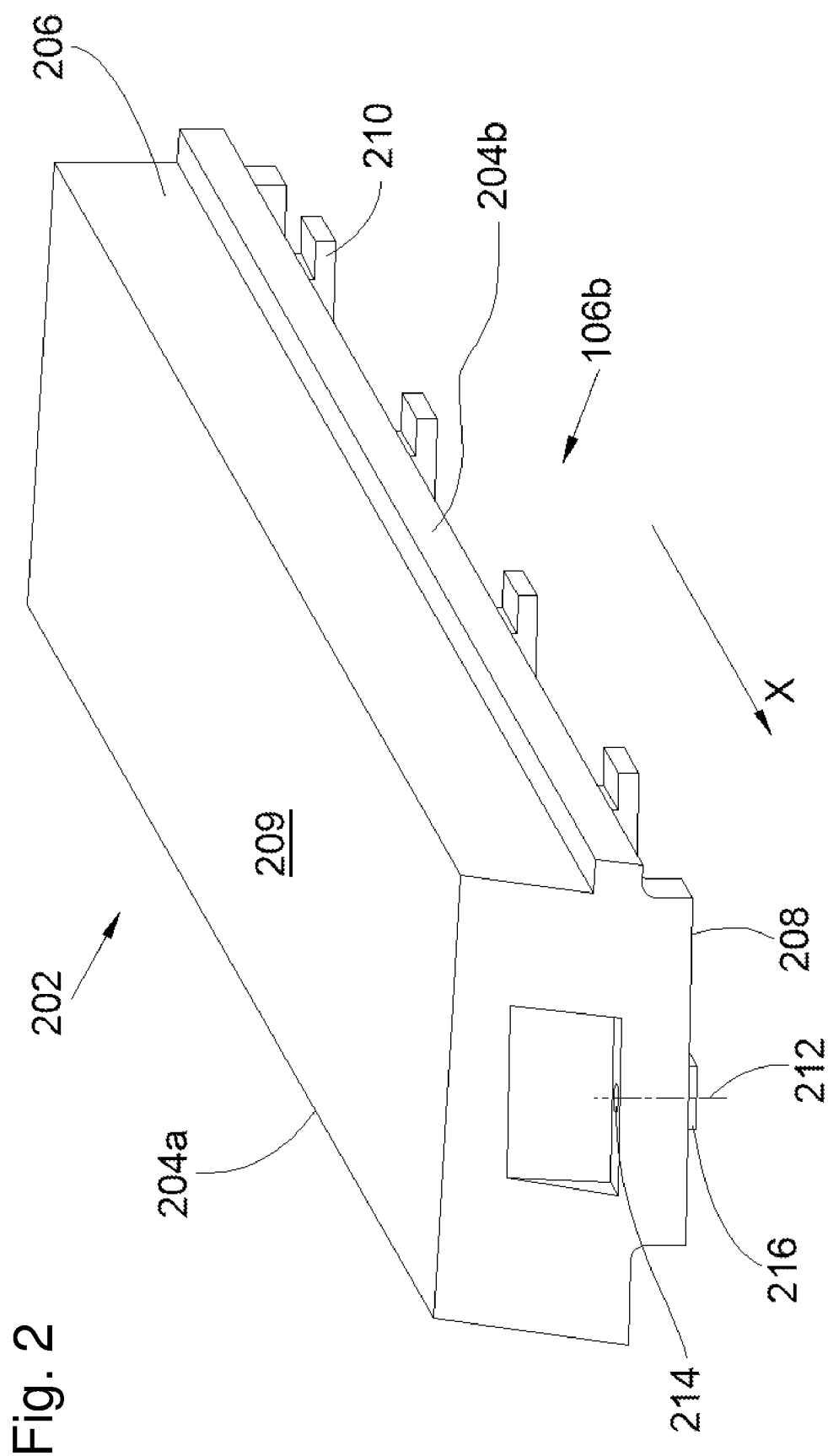
FIG. 2 is a perspective view of a punch of a tool according to the invention.

FIG. 2 shows a punch 202.

Figure 3:
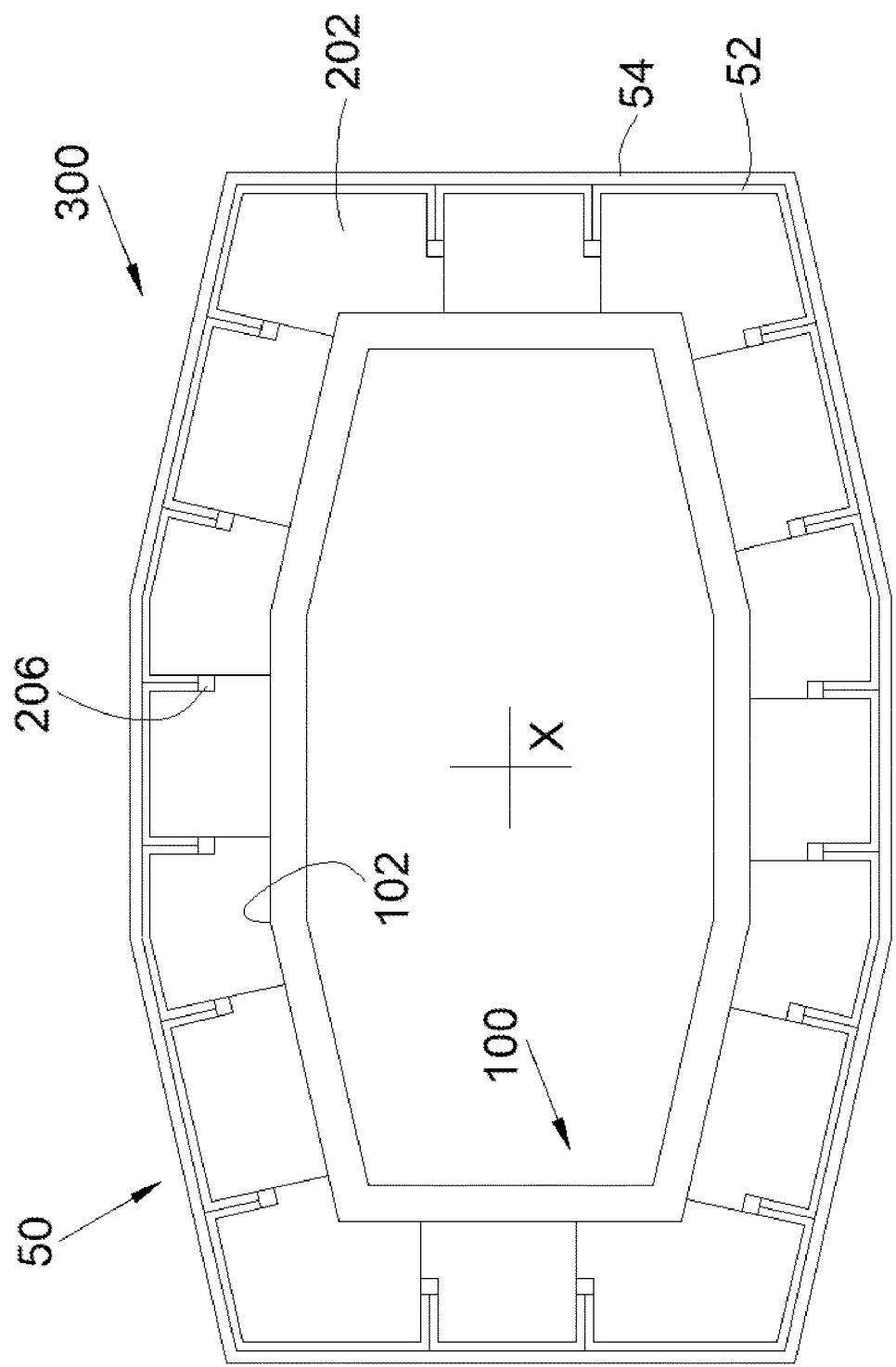
FIG. 3 is a view in section through a plane perpendicular to the axis of rotation of the support.

FIG. 3 shows a section through a plane perpendicular to the axis X of a tool 300 according to the invention. The tool 300 comprises the support 100 and a set of punches 202 where each punch 202 is secured to the support 100, and more particularly to the envelope 102, by means of two securing systems 106a-b, where each securing system 106a-b comprises first securing means 106a that are mounted on the support 100, and second securing means 106b that are mounted on the punch 202. There is a securing system 106a-b to the left of the punch 202, and one to the right.

As will be explained hereinbelow, each securing system 106a-b may adopt either a securing position in which the first securing means 106a cooperate with the second securing means 106b in order to secure the punch 202 to the support 100, or a release position in which the first securing means 106a do not cooperate with the second securing means 106b in order to allow the punch 202 to be separated from the support 100.

In this case, each punch 202 has the overall shape of a rectangular parallelepiped. The punches 202 are positioned next to one another parallel to the axis X. Thus, two adjacent punches 202 are in contact with one another at a contact face 204a-b. This means that each punch 202 has two contact faces 204a-b, specifically a first contact face 204a and a second contact face 204b, which are mutually parallel. Each contact surface 204a-b is also overall perpendicular to the surface of the envelope 102.

In the embodiment of the invention presented here, one of the contact faces, in this case the second contact face 204b, has a recess 206 which extends over the length parallel to the axis X of the punch 202. As will be explained below, this recess 206 makes it possible to create a stiffener. This means that a stiffener is formed at each recess 206.

According to another embodiment, a recess can also be provided at each contact face 204a-b, and thus each stiffener is formed astride two adjacent punches 202.

In a general manner, a channel parallel to the axis X is delimited between two adjacent punches 202, this channel is created by the recess(es) 206 of the punches 202 and makes it possible to create the stiffeners.

Each punch 202 comprises a base 208 which is laid on the support 100 and an outer face 209 which is opposite the base 208 and is oriented outwards.

In order to secure the punch 202 parallel to the axis X, two main securing means are provided between the punch 202 and the support 100. Each main securing means is provided at one end of the punch 202 and adopts either a locking position in which the punch 202 is locked on the support 100 or an unlocking position in which the punch 202 is not locked on the support 100 and is therefore free.

In the embodiment of the invention shown here, each main securing means is a tightening screw 212 (only one of which is shown in FIG. 2, and is represented by its axis), each one being positioned in a bore 214 at one of the ends of the punch 202, and where the tightening screw 212 is screwed into the support 100 in a tapped hole 108 provided for that purpose.

In a general manner, the method for manufacturing a self-stiffened panel 50 of composite material comprises creating first layers of fibers 52 around each punch 202, and more particularly around the outer face 209, around the recess 206, and around the contact face 204a opposite the recess 206. These first layers of fibers 52 may be deposited directly on the punch 202, or may be shaped beforehand in the form of a carbon preform which is subsequently put in place on the punch 202.

In the case of two recesses per punch 202, the first layers of fibers 52 are deposited around the outer face 209 and around each recess 206.

The manufacturing method then comprises depositing each punch 202, equipped in this manner with the first layers of fibers 52, on the support 100 mounted on the chuck. Then the main securing means 212 are placed in the locking position and each securing system 106a-b corresponding to the punch 202 is moved from the release position to the securing position. The punches 202 are thus deposited and clamped against one another.

In the context of the creation of a cylindrical self-stiffened panel 50, the chuck is rotated so as to turn the support 100 and thus permit easy access from above to each face of the envelope 102 in order to successively deposit the punches 202 on each face of the support 100.

When all of the punches 202 are in place, the manufacturing method is continued by laying-up second layers of fibers 54 around the first layers of fibers 52 to form the skin of the cylindrical self-stiffened panel 50 and integrate the first layers of fibers 52 of two mutually adjacent punches 202. To that end, the support 100 is rotated by means of the chuck and the second layers of fibers 54 are deposited during this rotation.

The manufacturing method is then continued conventionally by putting the assembly into a vacuum bag and heating in an autoclave in order to polymerize the resin contained in the layers of fibers 52 and 54.

After curing of the layers of fibers 52 and 54, and removal from the vacuum bag, the cylindrical self-stiffened panel 50 is created, the securing systems 106a-b of each punch 202 are then moved from the securing position to the release position and the main securing means are placed in the unlocking position in order to separate the punch 202 from the support 100, and the punch 202 is removed by moving parallel to the axis X in order to extract the punch 202 from the self-stiffened panel 50 which in this case is cylindrical.

The securing systems 106a-b also serve to limit the deformations of the punch 202 as the temperature rises in the autoclave.

The first layers of fibers 52 of two adjacent punches 202 form between the two punches 202, the stiffeners of the self-stiffened panel 50 and the first layers of fibers 52, which are on the outer face 209, fuse with the second layers of fibers 54 to form the skin of the self-stiffened panel 50.

Figure 4:
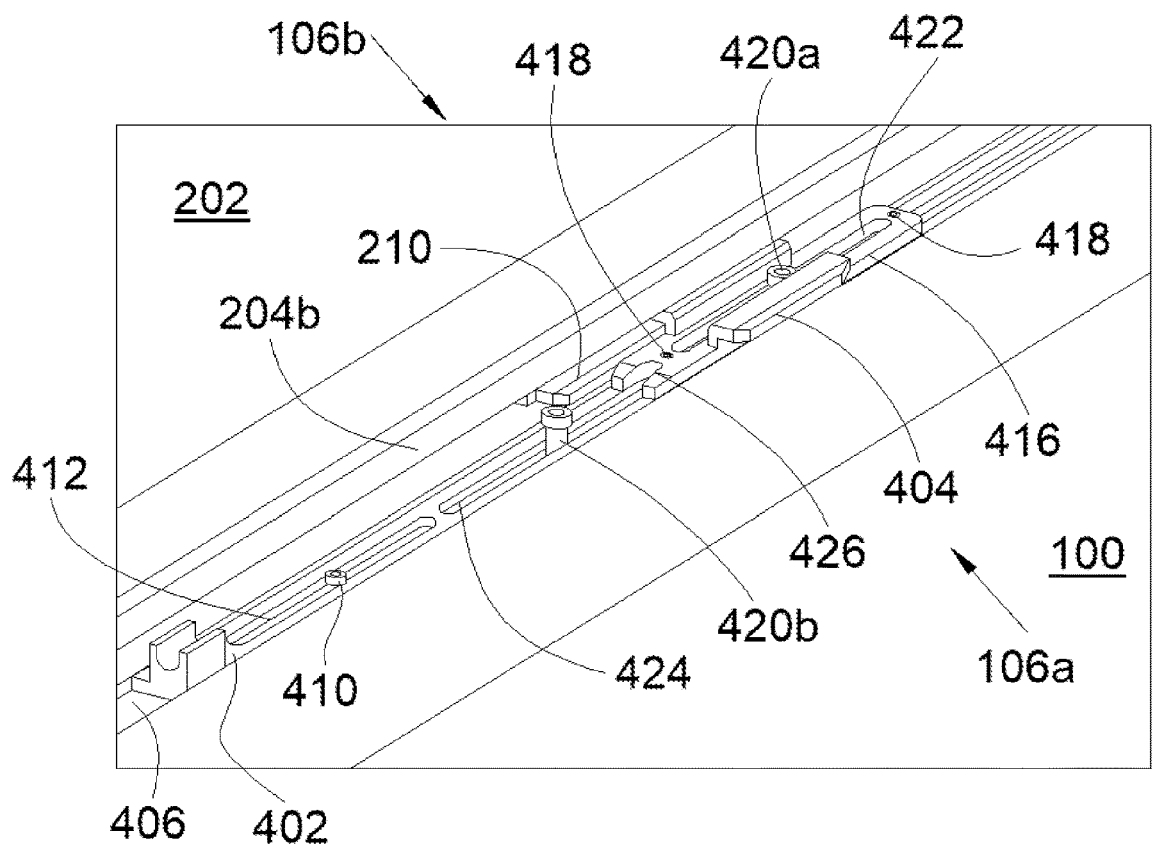
FIG. 4 is a perspective view of a detail of the means for securing a punch to the support in an intermediate position.
Figure 5:
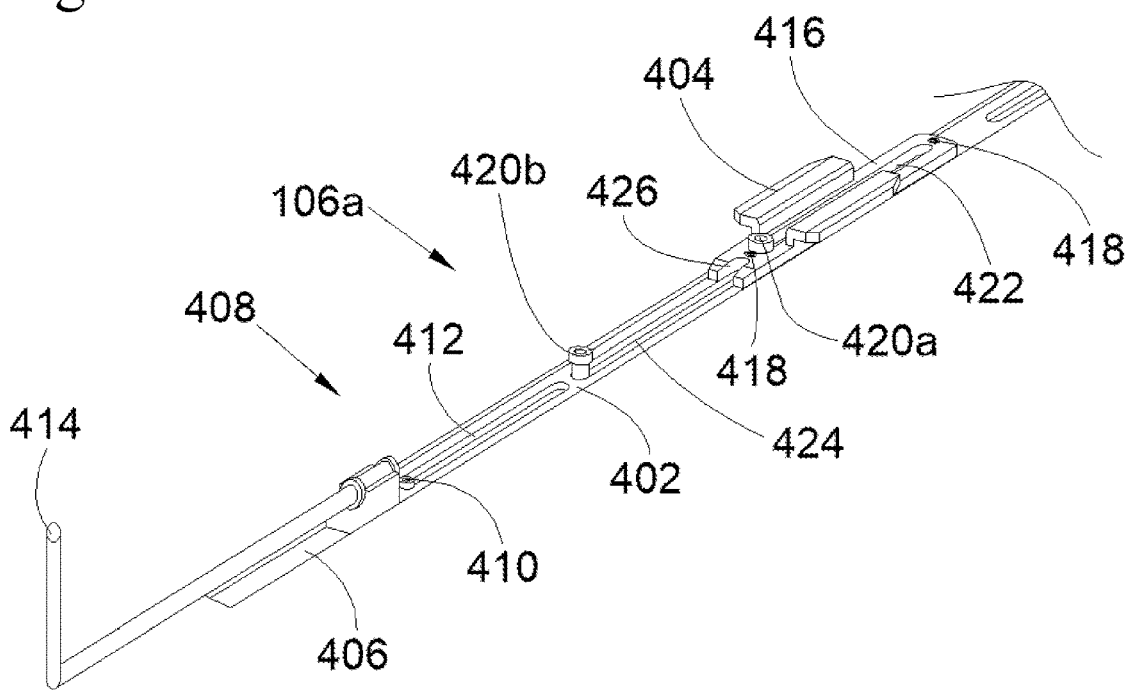
FIG. 5 is a perspective view of the securing means.

FIGS. 4 and 5 show a securing system 106a-b.

The first securing means 106a comprise a slider 402 that is mounted so as to be able to move in translation on the support 100 parallel to the axis X and at least one hook 404 that is secured to the slider 402 and distributed over the length parallel to the axis X of the slider 402. The slider 402 has an inner face that faces the support 100 and an outer face that is oriented in the opposite direction, that is to say, outwards.

In order to guide the slider 402 in translation, the support 100 has a straight groove 406 extending parallel to the axis X, but this guiding could be brought about by any equivalent means, such as by cooperation between a rail integral with the support 100 and the slider 402.

In the embodiment of the invention presented here, in order to hold the slider 402 on the support 100, there are provided holding means 408. These holding means 408 comprise an oblong window 412 passing through the slider 402 between the inner face and the outer face, and a holding screw 410 that is screwed into a tapped hole of the support 100 provided to that end, the holding screw 410 being screwed through the oblong window 412, and the head of the holding screw 410 extending beyond the edges of the oblong window 412 and facing the outer surface. The degree of tightening of the holding screw 410 must be loose enough to allow the slider 402 to move without excessive force, and tight enough to avoid stray movements of the slider 402. In order to achieve a better hold, there is provided at least one holding screw 410 and one oblong window 412 at each end of the slider 402.

In order to limit the translational movement of the slider 402, it is possible to provide stopping means. These stopping means may, for example, comprise a spring-loaded peg that is as one with the slider 402, and a hole created in the support 100, the peg becoming positioned in the hole in order to prevent the translational movement. In order to permit multiple stopping positions, it is possible to create multiple holes and, as required, the peg will then be inserted into one or another of the holes. It is of course possible to use other stopping means, and these may comprise, for example, the edges of the oblong window 412 in which the holding screw 410 comes to abut in the event of translation parallel to the axis X.

The second securing means 106b comprise at least one nose 210 that is integral with the punch 202, and more particularly with the base 208. There is one nose 210 per hook 404.

In the embodiment of the invention presented here, the noses 210 are oriented towards the outside of the punch 202, and the hooks 404 are oriented towards the inside of the punch 202 when the latter is in position on the support 100.

Preferably, there is at least one nose 210 and one hook 404 at each end of the punch 202, and at least another nose 210 and another hook 404 between the two first noses 210 and hooks 404.

Preferably, there is one nose 210 and one hook 404 every 80 cm in order to ensure that the punch 202 is adequately held when the support 100 is turned over. Of course, this value also depends on the dimensions of the self-stiffened panel 50 that is to be created.

In the release position, the hooks 404 do not cooperate with the noses 210, that is to say, they are offset with respect to one another parallel to the axis X.

In the securing position, each hook 404 cooperates with one nose 210. In this securing position, the hook 404 is positioned above the nose 210 with respect to the envelope 102, that is to say that the nose 210 is located between the support 100 and the hook 404. Thus, in this securing position, in the event of the support 100 being turned over, the noses 210 remain wedged between the hooks 404 and the support 100, and this avoids deformation of the punch 202.

FIG. 4 shows an intermediate position in which the hook 404 starts to cover the nose 210.

The slider 402 is also equipped with actuating means which in this case take the form of a handle 414 and which make it possible to actuate the slider 402 in order to move it from the securing position to the released position and vice versa. The handle 414 may be removable.

The noses 210 and hooks 404 serve to secure in a direction perpendicular to the surface of the envelope 102.

In the embodiment of the invention shown here, the tool 300 also comprises, at each end of the punch 202, a removable shim 216 which is positioned between the end of the punch 202 and the support 100. This shim 216 makes it possible to raise up the punch 202 and hence the noses 210 in order that these are indeed in contact with the hooks 404 when in the securing position, and the removal of this shim 216 makes it possible to lower the punch 202 and hence the noses 210 which are then free to pass beneath the hooks 404, when removing the punch 202, parallel to the axis X of the self-stiffened panel 50 after curing.

The shim 216 may, for example, be a washer which is fitted onto the tightening screw 212 between the punch 202 and the support 100.

Thus, once a punch 202 has been deposited onto the support 100, the shim 216 is positioned between the punch 202 and the support 100, the main securing means are placed in the locking position and the securing systems 106a-b are placed in the securing position by the noses 210 being straddled by the hooks 404.

After curing of the fibers 52 and 54, the securing systems 106a-b are placed in the release position, and the main securing means are placed in the unlocking position in order that the shim 216 may be removed and the punch 202 and the noses 210 may be lowered so as to allow the punch 202 to move in translation in order to be removed.

In the embodiment of the invention shown in FIG. 3, the self-stiffened panel 50 shown is cylindrical and requires that the support 100 be turned over, but the tool 300 according to the invention may also be used for a self-stiffened panel 50 that is overall flat.

In the embodiment of the invention presented here, for two adjacent punches 202, the first securing means 106a corresponding to one of the punches 202 and the first securing means 106a corresponding to the other of the punches 202 have a common slider 402 which bears the hooks 404 that cooperate with the noses 210 of two adjacent punches 202 in order to simultaneously secure the two punches 202, but it is of course possible to provide one slider 402 for each one of the two adjacent punches 202.

In order to ensure that the first securing means 106a are adaptable in the event of changes of punches 202 and hence of noses 210, each hook 404, or in this case each pair of hooks 404 for two adjacent punches 202, are integral with a body 416 that is removably secured to the slider 402. The removable securing is in this case brought about by two securing screws 418 that are screwed into tapped holes provided for that purpose in the slider 402, the body 416 being sandwiched between the heads of these screws and the slider 402.

According to one particular embodiment, the tool 300 comprises two set screws 420a-b which are secured to the support 100. The first set screw 420a passes in succession through the slider 420 and the body 416, through first oblong windows 422 provided for that purpose. The second set screw 420b passes through the slider 420, through a second oblong window 424 provided for that purpose.

The body 416 also has a notch 426 which is arranged so as to receive the second set screw 420b in the securing position. Thus, in the securing position, the first set screw 420a is received in the first oblong windows 422 and the second set screw 420b is received in the notch 426, making it possible to immobilize the body 416 in the desired position.

The tool 300 can also be used when its axis X is vertical. In order to ensure that the punches 202 are in abutment, and thus to ensure that the punches 202 are supported, the support 100 comprises, in its lower portion, a wall 110 which extends around the perimeter of the support 100 and against which one of the ends of each punch 202 bears.

More particularly, the method for manufacturing a self-stiffened panel 50 made of composite material using the tool 300 involves:
- a first provision step during which the support 100 is provided, and during which the shaft 104 is secured to the chuck of the rotating machine,
- a second provision step during which the punches 202 are provided,
- a first lay-up step during which the first layers of fibers 52 are deposited onto the punches 202,
- a deposition step during which a punch 202 laid-up in this manner is deposited onto the support 100,
- a locking step during which the main means 212 of securing the punch 202 wedged in this manner are placed in the locking position,
- a securing step during which the systems 106a-b for securing the punch 202 locked in this manner are moved from the release position to the securing position,
- a first step of looping back to the deposition step until all of the punches 202 have been deposited,
- a second lay-up step during which the second layers of fibers 54 are deposited onto the first layers of fibers 52,
- a vacuum-bagging step during which the assembly which has been laid-up in this manner is placed in a vacuum bag,
- a heating step during which the assembly which has been vacuum-bagged in this manner is heated in an autoclave,
- a release step during which the systems 106a-b for securing a punch 202 are moved from the securing position to the release position,
- an unlocking step during which the main means 212 of securing the punch 202 released in this manner are placed in the unlocking position,
- a removal step during which the punch 202 unlocked in this manner is removed by displacement parallel to the axis X, and
- a second step of looping back to the release step until all of the punches 202 have been removed.

In the particular case of using shims 216, the manufacturing method comprises, between the deposition step and the locking step, a wedging step during which the shims 216 are positioned between the punch 202 deposited in this manner and the support 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tool for creating a self-stiffened panel, said tool comprising:
   a support having a shaft with an axis,
   a set of punches arranged next to one another parallel to the axis, a channel parallel to the axis being delimited between two adjacent punches,
   for each punch, two securing systems, where each securing system comprises first securing means comprising a slider that is able to move in translation on the support parallel to the axis and at least one hook secured to the slider, and second securing means comprising at least one nose integral with the punch,
   for each punch, two main securing means, each being provided at one end of the punch and adopting either a locking position in which the punch locked on the support or an unlocking position in which the punch is not locked on the support, and
   actuating means that are configured to move the slider alternately from a securing position in which each nose is located between the support and a hook, to a release position in which the hooks are offset with respect to the noses parallel to the axis.

2. The tool according to claim 1, wherein, for each punch, the tool comprises two removable shims, each being positioned between an end of the punch and the support.

3. The tool according to claim 1, wherein, for two adjacent punches, the first securing means corresponding to one of the two adjacent punches and the first securing means corresponding to the other of the two adjacent punches share a slider.

4. The tool according to claim 1, wherein, at each end of the slider, an oblong window is pierced in said slider and said tool comprises a holding screw screwed into a tapped hole of the support through the oblong window, a head of the holding screw extending beyond edges of the oblong window.

5. The tool according claim 1, wherein each hook is integral with a body that is removably secured to the slider.

6. The tool according to claim 5, wherein the tool comprises two set screws secured to the support, wherein a first set screw of the two set screws passes through the slider and the body via first oblong windows provided for that purpose, wherein a second set screw of the two set screws passes through the slider via a second oblong window provided for that purpose, wherein the body has a notch, and wherein said notch is arranged so as to receive the second set screw in the securing position.

7. The tool according to claim 1, wherein the support comprises, at its lower part, a wall that extends around a perimeter of said support.

8. A method for manufacturing a self-stiffened panel made of composite material using a tool according to claim 1, said manufacturing method comprising:
providing the support, in a first provision step, and during the first provision step, securing the shaft to a chuck of a rotating machine,
providing punches, in a second provision step,
depositing first layers of fibers onto the punches, in a first lay-up step,
depositing a punch laid-up in this manner onto the support, in a deposition step,
placing the main means of securing the punch wedged in this manner in the locking position, in a locking step,
moving the systems for securing the punch locked in this manner from the release position to the securing position, in a securing step,
looping back to the deposition step until all of the punches have been deposited, in a first looping back step,
depositing second layers of fibers onto the first layers of fibers, in a second lay-up step,
placing an assembly which has been laid-up in this manner in a vacuum bag, in a vacuum-bagging step,
heating the assembly which has been vacuum-bagged in this manner, in an autoclave in a heating step,
moving the systems for securing a punch from the securing position to the release position, in a release step,
placing the main means of securing the punch released in this manner in the unlocking position, in an unlocking step,
removing the punch unlocked in this manner by displacement parallel to the axis, in a removal step, and
looping back to the release step until all of the punches have been removed, in a second looping back step.

9. The manufacturing method according to claim 8, further comprising, between the deposition step and the locking step, positioning two removable shims between the punch deposited in this manner and the support, in a wedging step.

* * * * *